US007912571B2

(12) United States Patent
Hama

(10) Patent No.: US 7,912,571 B2
(45) Date of Patent: Mar. 22, 2011

(54) SHEET MATERIAL PATTERNING APPARATUS, AND METHOD AND PROGRAM FOR SAME

(75) Inventor: Kazunari Hama, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 986 days.

(21) Appl. No.: 11/718,940

(22) PCT Filed: Nov. 8, 2005

(86) PCT No.: PCT/JP2005/020408

§ 371 (c)(1),
(2), (4) Date: May 9, 2007

(87) PCT Pub. No.: WO2006/051764

PCT Pub. Date: May 18, 2006

(65) Prior Publication Data

US 2007/0293975 A1 Dec. 20, 2007

(30) Foreign Application Priority Data

Nov. 10, 2004 (JP) ................................ 2004-326058

(51) Int. Cl.
*G06F 19/00* (2006.01)

(52) U.S. Cl. ...................................................... 700/134

(58) Field of Classification Search .................. 700/130, 700/131, 132, 133, 134, 135
See application file for complete search history.

(56) References Cited

U.S. PATENT DOCUMENTS

| | | | | |
|---|---|---|---|---|
| 4,725,961 | A | 2/1988 | Pearl | |
| 4,941,183 | A * | 7/1990 | Bruder et al. | 700/171 |
| 5,175,806 | A * | 12/1992 | Muskovitz et al. | 345/582 |
| 5,258,917 | A * | 11/1993 | Bruder et al. | 700/171 |
| 5,831,857 | A | 11/1998 | Clarino et al. | |
| 5,953,232 | A * | 9/1999 | Blaimschein | 700/171 |
| 6,502,489 | B2 * | 1/2003 | Gerent et al. | 700/134 |
| 6,868,303 | B1 * | 3/2005 | Chabirand Garçonnet et al. | 700/135 |

FOREIGN PATENT DOCUMENTS

| | | | |
|---|---|---|---|
| JP | 6-68211 | A | 3/1994 |
| JP | 8-221468 | A | 8/1996 |
| JP | 11-259535 | A | 9/1999 |

* cited by examiner

*Primary Examiner* — Danny Worrell
(74) *Attorney, Agent, or Firm* — Rothwell, Figg, Ernst & Manbeck

(57) ABSTRACT

The shape of a leather sheet is inputted though a digitizer. The shape of the leather sheet is disposed inside a rectangle, and dummy parts are arranged around the leather sheet. Assuming the dummy parts as arranged parts, other parts are blocked and other parts are arranged inside the shape of the leather sheet. Attributes such as the orientation and presence/absence of the scratch are added to the shape data on the leather sheet, and parts are so arranged as to match the orientation and scratch allowability suited to the parts. Even a patterning device which handles only a rectangular shape can produce patterns on a sheet of irregular shape such as a leather sheet.

7 Claims, 9 Drawing Sheets

SHEET MATERIAL PATTERNING APPARATUS, AND METHOD AND PROGRAM FOR SAME

CROSS REFERENCE TO RELATED APPLICATION

This application is a 35 USC §371 National Phase Entry Application from PCT/JP2005/020408, filed Nov. 8, 2005, and designating the United States.

TECHNICAL FIELD

The present invention is related to the patterning of an irregularly shaped sheet material, such as leather, and more particularly to an apparatus therefor, a patterning method and a patterning program.

BACKGROUND ART

Japanese Patent Publication 3-64280 and U.S. Pat. No. 2,939,443 disclose patterning for irregularly shaped sheet materials, such as leather. These shapes are determined and inputted using a digitizer or the like, and a place having a defect is marked inside the image of the leather on a screen. Then, the parts to be patterned are positioned inside the leather image so as to avoid the defect, the leather is cut in accordance with the positioning of the parts, and the parts are removed.

However, since an ordinary patterning apparatus is used to cut a rectangular cloth or the like, it is not designed for patterning irregular shapes other than a rectangle. Accordingly, for example, adding a single layer image depicting the shape of a sheet material is likely to cause an error if a part is protruding outside the sheet material layer. However, a patterning apparatus is originally designed to closely position parts inside a rectangular shape, and just adding a layer will simply cause a string of errors, with no guarantee that it will be possible to position parts inside the sheet material.

DISCLOSURE OF THE INVENTION

The basic task of the present invention is to enable patterning to be carried out on an irregularly shaped sheet material using an apparatus designed for patterning parts on a rectangular sheet material, and more particularly to prevent parts from being positioned outside the sheet material.

Another task of the present invention is to pattern parts so that the parts match up with attributes, such as the orientation and defects of a sheet material.

A patterning apparatus of the present invention is an apparatus for patterning a sheet material by arranging a plurality of parts inside a rectangle, and is characterized in that there are provided means for inputting an irregular shape of a sheet material, and means for arranging the inputted sheet material shape inside the above-mentioned rectangle, and, in addition, for treating a part outside the shape of the sheet material within the rectangle as a dummy part, and a plurality of parts are arranged inside the shape of the sheet material by blocking the dummy part from overlapping with the other parts.

It is desirable that the present invention provide means for adding the attributes of the respective portions of a sheet material to data representing the shape of the sheet material; means for adding a required attribute for a part to parts data; and means for patterning parts so that the attributes of the respective portions of the sheet material match the required attributes for the parts.

A patterning method of the present invention is a method for patterning a sheet material by arranging a plurality of parts inside a rectangle, and is characterized in that the irregular shape of a sheet material is inputted and arranged inside the above-mentioned rectangle, and, in addition, a dummy part comprising an area outside of the shape of the sheet material is generated inside the rectangle, and the above-mentioned plurality of parts are arranged on the inside of the shape of the sheet material.

A patterning program of the present invention is a program for an apparatus for patterning a sheet material by arranging a plurality of parts inside a rectangle, and is characterized in that there are provided a command for inputting an irregular shape of a sheet material; and a command for arranging the inputted shape of the sheet material inside the above-mentioned rectangle, and, in addition, for treating a portion outside of the shape of the sheet material within the rectangle as a dummy part, and the above-mentioned plurality of parts are arranged inside the shape of the sheet material while blocking the dummy part from overlapping with the other parts.

In the present invention, because the outer side of the sheet material is blocked as a dummy part, parts are not arranged outside of the sheet material within the rectangle. Thus, even a patterning apparatus, which is only capable of processing a rectangular shape, can easily position a plurality of parts inside an irregularly shaped sheet material.

In a sheet material, such as leather, there are characteristic features, such as the strength of an orientation and the direction thereof, the presence of a defect, and the strength and expansion ratio of each region, and these characteristic features are called attributes in the present invention. Then, when attributes are added to data representing the shape of a sheet material, and required attributes are also added to parts data, parts can be fitted inside the sheet material, and parts can be parranged such that the required attributes of the parts are matched up with the attributes of the sheet material.

Figure 1:
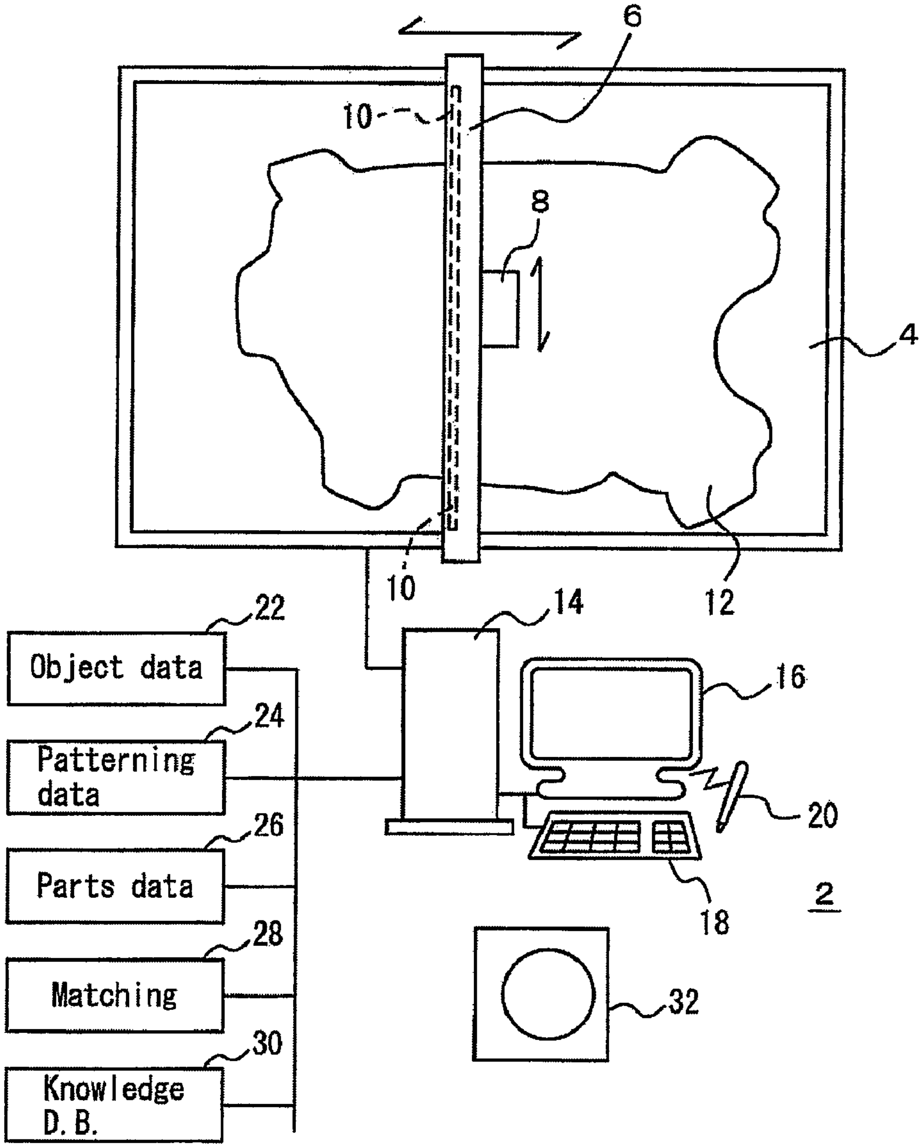
FIG. 1 is a block diagram of a patterning apparatus of the embodiment.

| EXPLANATION OF REFERENCE NUMERALS | |
|---|---|
| 2 | PATTERNING APPARATUS |
| 4 | TABLE |
| 6 | ARM |

-continued

| EXPLANATION OF REFERENCE NUMERALS | |
|---|---|
| 8 | CUTTING HEAD |
| 10 | SCANNER |
| 12 | LEATHER |
| 14 | COMPUTER |
| 16 | DISPLAY |
| 18 | KEYBOARD |
| 20 | STYLUS |
| 22 | OBJECT DATA STORAGE PORTION |
| 24 | PATTERNING DATA STORAGE PORTION |
| 26 | PARTS DATA STORAGE PORTION |
| 28 | MATCHING UNIT |
| 30 | KNOWLEDGE DATABASE |
| 32 | PATTERNING PROGRAM RECORDING MEDIUM |
| 34 | OBJECT DATA CREATION COMMAND |
| 36 | INTERPOLATION COMMAND |
| 38 | KNOWLEDGE DATABASE CREATION COMMAND |
| 40 | DUMMY PARTS CREATION COMMAND |
| 42 | PARTS DATA INPUT COMMAND |
| 44 | PATTERNING DATA CREATION COMMAND |
| 46 | CUTTING COMMAND |
| 50, 60, 70 | OBJECT DATA |
| 51, 52 | DUMMY PARTS BOUNDARY LINE |
| 54 THROUGH 56 | ORIENTATION DATA |
| 57 THROUGH 59 | DEFECT DATA |
| 80 | PARTS DATA |
| 81 | PARTS |
| 100 | PATTERNING DATA |
| 101, 102 | DEFECT DATA |
| 103 | PARTS |
| D1 THROUGH D8 | DUMMY PARTS |

BEST MODE FOR CARRYING OUT THE INVENTION

The preferred embodiment for putting the present invention into effect will be described below.

FIGS. 1 through 10 show the embodiment. In these figures, 2 is a patterning apparatus, 4 is a rectangular table, and an arm 6 is constituted so as to be able to move parallel to the longitudinal direction of the table 4. A cutting head 8 is disposed on the arm 6, and is constituted so as to be able to move parallel to the direction of the shorter side of the table 4, and a scanner 10 is disposed along the arm 6, and is constituted so as to enable the outline (shape) of an irregularly shaped sheet material, such as a piece of leather 12, to be inputted. Furthermore, inputting the outline of a piece of leather 12, for example, can also be done by using a digital camera or the like to photograph an image of the leather 12 positioned on top of the table 4, and compensating for the fact that the reduction ratio of the image becomes larger in accordance with the distance from the center of the camera's field of view. Further, a digitizer can be used as the table 4, and the outline shape of the leather 12 can be inputted by using a stylus 20 or the like to trace the outline of the leather 12. Here, it is supposed that the irregularly shaped sheet material is a piece of leather 12, but it could also be a scrap of cloth or some other sheet material.

Fourteen (14) is a computer, 16 is a display device, 18 is a keyboard, 20 is a stylus, and a mouse or other such inputting means can also be used. The keyboard 18 and the stylus 20 are manual inputting means. An object data storage portion 22 is provided in the computer 14, and stores the shape data of the leather 12, the data of the dummy parts therearound, as well as the attribute data of the respective parts of the leather 12. A patterning data storage portion 24 stores dummy parts data and data on the layout of the respective parts positioned inside the leather 12. Furthermore, the layout of the dummy parts does not have to be stored in the patterning data storage portion 24. A parts data storage portion 26 stores the shape data and attribute data of the plurality of parts to be positioned inside the leather 12.

A matching unit 28 positions the respective parts stored in the parts data storage portion 26 in an area on the inner side of the dummy part, which is within a rectangular area of an appropriate size on the inside of the table 4. At this time, the attributes of the respective regions of the leather 12 stored in the object data storage portion 22 are positioned so as to match up as much as possible with the required attributes of the parts stored in the parts data storage portion 26. An algorithm for carrying out matching is known as a knapsack problem or optimal location problem. A knowledge database 30, for example, stores standard values relative to the region names of the respective regions of the leather 12, such as the extent of orientation and direction thereof, strength, and expansion ratio, and upon determining the region names of the leather 12, such as front leg, shoulder, back, abdomen, and so forth, facilitates inputting the attributes of the leather 12 by outputting the orientation strength and the direction thereof, and the expansion ratio corresponding thereto.

Figure 2:
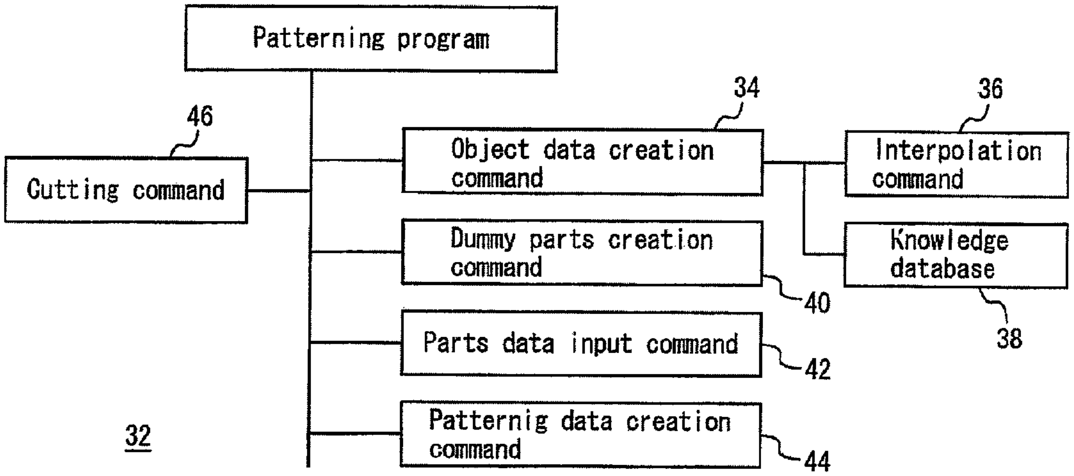
FIG. 2 is a block diagram of a patterning program of the embodiment.

Thirty-two (32) is a storage medium for a patterning program, and everything from the object data storage portion 22 through the knowledge database 30 is generated inside the computer 14 by reading this patterning program 32 into the computer 14. The constitution of the patterning program 32 is shown in FIG. 2. An object data creation command 34 receives the leather 12 shape and attribute inputs, and creates object data. Here, when attributes other than a defect, such as orientation and strength, are inputted for limited areas of the leather 12, an interpolation command 36 interpolates the locations for which the attributes have been inputted, and the orientation direction and strength between locations. A knowledge database creation command 38 is a command for creating a knowledge database 30 inside the computer 14.

A dummy parts creation command 40 is a command for generating dummy parts on the outer side of the leather 12 shape data, and the contour of the dummy parts comprises a cutting-not-required attribute. A parts data input command 42 is a command for receiving the input of the shape data of the parts to be patterned, and the attribute data thereof. A patterning data creation command 44 is a command for creating data for positioning parts such that the attributes of the leather side and the parts side coincide as much as possible for an area, which is not blocked by the dummy part, which is in the rectangular area surrounding the leather 12. Further, a cutting command 46 is a command for cutting parts from the leather 12 using the cutting head 8, and, as mentioned above, a cutting-not-required attribute is provided for the contour of the dummy part, and a cutting-required attribute is provided for the contour of a part other than this.

Figure 3:
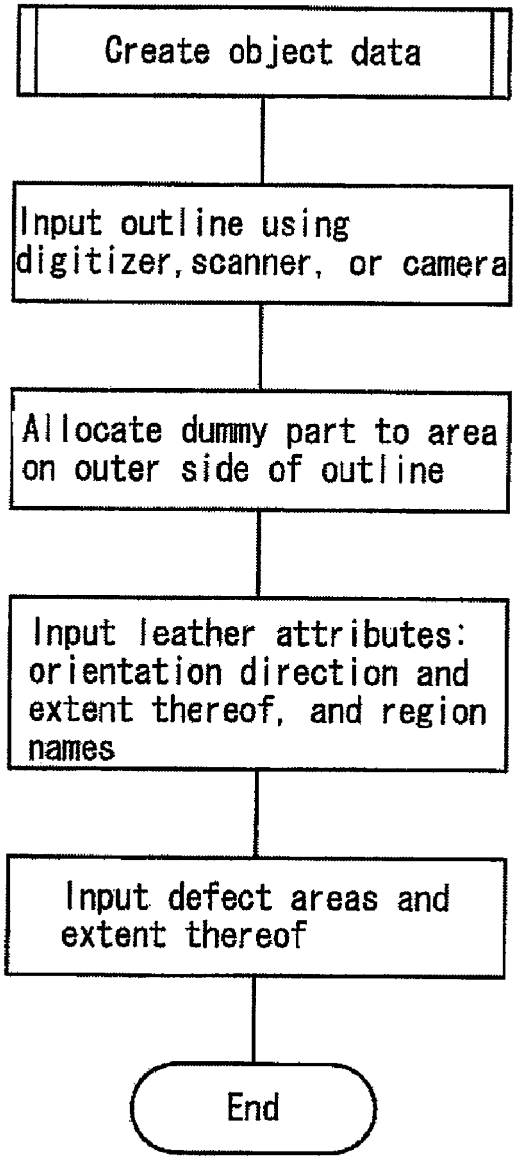
FIG. 3 is a flowchart showing an algorithm for creating object data in the embodiment.

FIG. 3 shows an algorithm for creating object data. A digitizer, scanner, camera or the like is used to input outline data for a sheet material, such as leather, into the patterning apparatus 2. At this time, the default value of the rectangular data, for example, is the overall size of the inside of the table 4. By so doing, the shape data of the sheet material is positioned inside the rectangular data representing the table 4, and the algorithm allocates one or a plurality of dummy parts on the outside of the sheet material. Next, the algorithm inputs the attributes of the leather, for example, the orientation direction and extent thereof, the region names, strength, expansion ratio and so forth for the area inside the dummy parts, in other words, for the inside of the sheet material. In addition, the algorithm inputs an area in which there is a defect in the leather, and the extent thereof, as defect data. In actuality, data related to a defect is treated as part of the attribute data of the leather.

Figure 4:
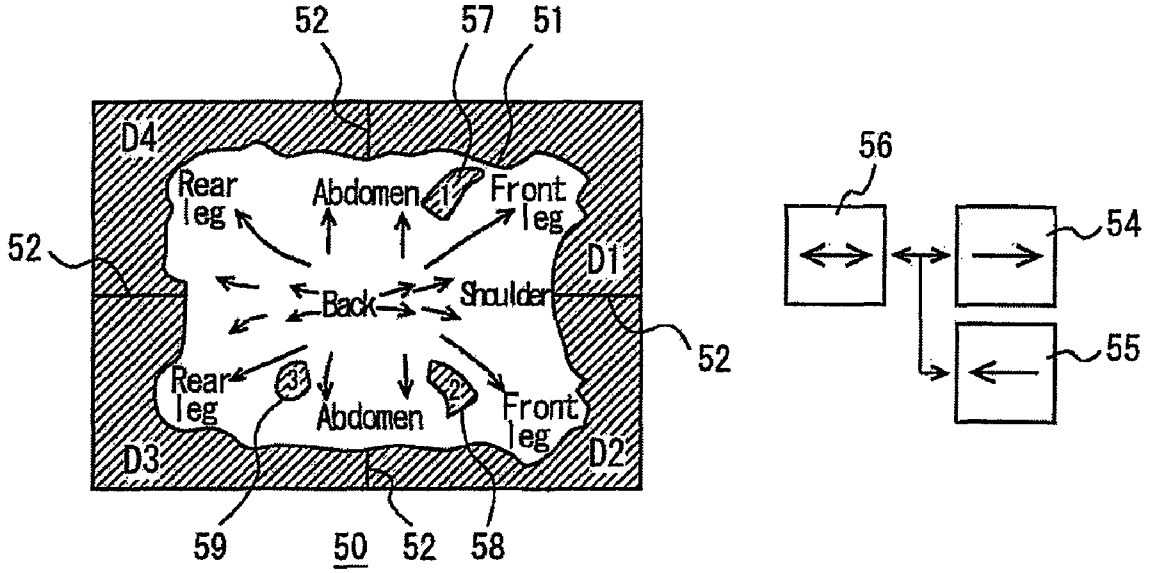
FIG. 4 is a diagram schematically showing an example of object data in the embodiment.
Figure 5:
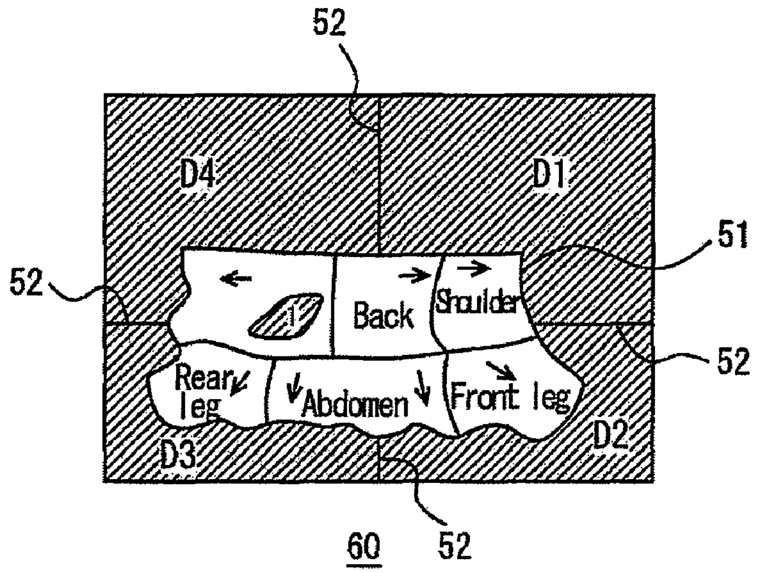
FIG. 5 is a diagram schematically showing another example of object data in the embodiment.
Figure 6:
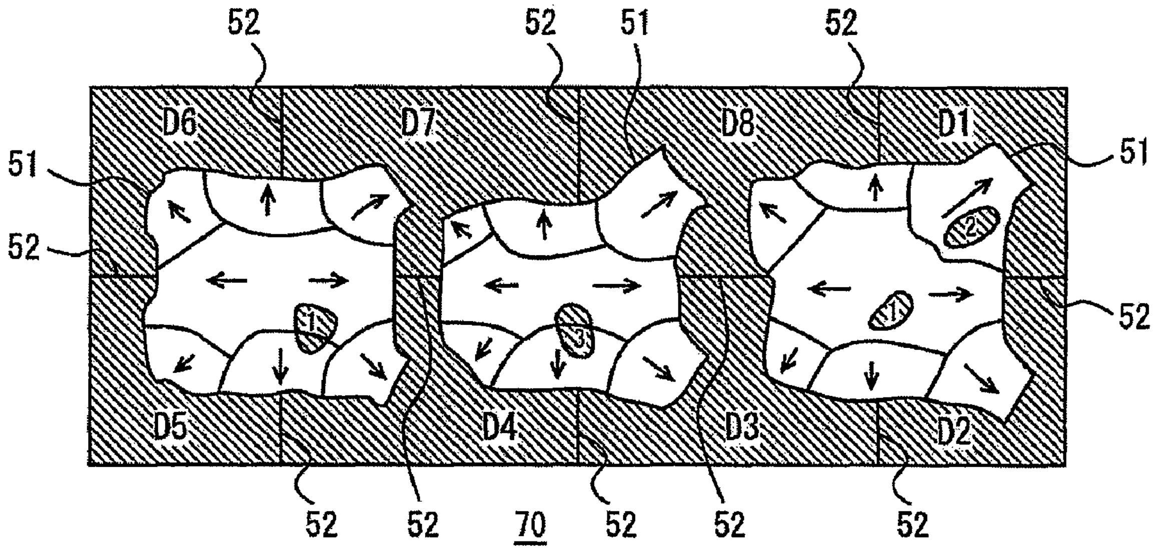
FIG. 6 is a diagram schematically showing yet another example of object data in the embodiment.

FIGS. 4 through 6 show examples 50 through 70 of object data. FIG. 4, for example, shows one cowhide's worth of object data, the outline thereof constitutes the boundary line 51 of the dummy parts, and, for example, four dummy parts D1 through D4 are positioned on the outer side of the shape data of the leather. The number of dummy parts is arbitrary, and, for example, the area outside the outline of the leather can be treated as one dummy part, or it can be treated as a larger number of dummy parts. Fifty-two (52) is the boundary line between dummy parts. And a cutting-not-required attribute is provided in the boundary lines 51 and 52 as described hereinabove.

Region names, such as front leg, shoulder, back and so forth, and the orientation direction, as well as the magnitude thereof, are described as attributes on the inside of the leather 12 shape data. Further, defect data 57 through 59 is described for the areas where there are defects. This data covers the areas where there are defects, and the value of defect data in areas where there are no defects is treated as 0, defect data value of 1 is for a minor defect, defect data 2 is a more serious defect than defect data 1, and defect data 3 is an even more serious defect. Interpretations of orientation directions are shown on the right side of FIG. 4. In orientation data 54, for example, the leather is oriented from the left to the right side, and in orientation data 55, the leather is oriented from the right to the left side. In orientation data 56, orientation data 54 and orientation data 55 are treated as the same data. It is arbitrary here as to whether the right-to-left orientation and the left-to-right orientation are treated as the same data as in orientation data 56, or whether a distinction is made between these as in orientation data 54 and 55.

In inputting the object data 50, for example, the region names, such as front leg, shoulder and back, can be inputted, and orientation direction and extent, strength, expansion ratio and so forth can be determined from the knowledge database 30. Further, a stylus 20 or the like can be used to input orientation direction and the strength thereof via arrows on the inside of the leather image without inputting the region names. Leather has attributes besides these, such as expansion ratio, strength, extremely valuable areas that can only be obtained from a small number of places on the hide of a single cow, and areas that are not so valuable, and these attributes, for example, can be inputted as color data by using the stylus 20 to make a color tracing. Since it is difficult to input attributes in detail for leather, these attributes can be inputted only in typical locations, and the gradual changes in the attributes therebetween can be interpolated. Or, a piece of leather can be divided into a plurality of groups, and the attributes can be practically standardized inside the respective groups, attributes that typify a group can be inputted, and in the vicinity of the boundary between one group and another, the attributes can be intermediaries of the two groups.

The defect data 57 through 59, for example, can be inputted by using the stylus 20 to mark the areas in the image of the leather where there are defects, and inputting the values of defect data as color data. Furthermore, in addition to manually inputting attributes such as the orientation direction, and the presence or absence of defects, these attributes can also be automatically generated using image recognition when a leather image is scanned by the scanner 10, or when the leather is photographed using a digital camera.

FIG. 5 shows a half of a cowhide's worth of object data 60, but otherwise is the same as the object data 50 of FIG. 4. FIG. 6, for example, shows three cowhide's worth of object data 70, and in this case, eight dummy parts D1 through D8 are positioned on the outer side of the leather shape. Otherwise, the object data 50 of FIG. 6 is the same as the object data 50 of FIG. 4.

Figure 7:
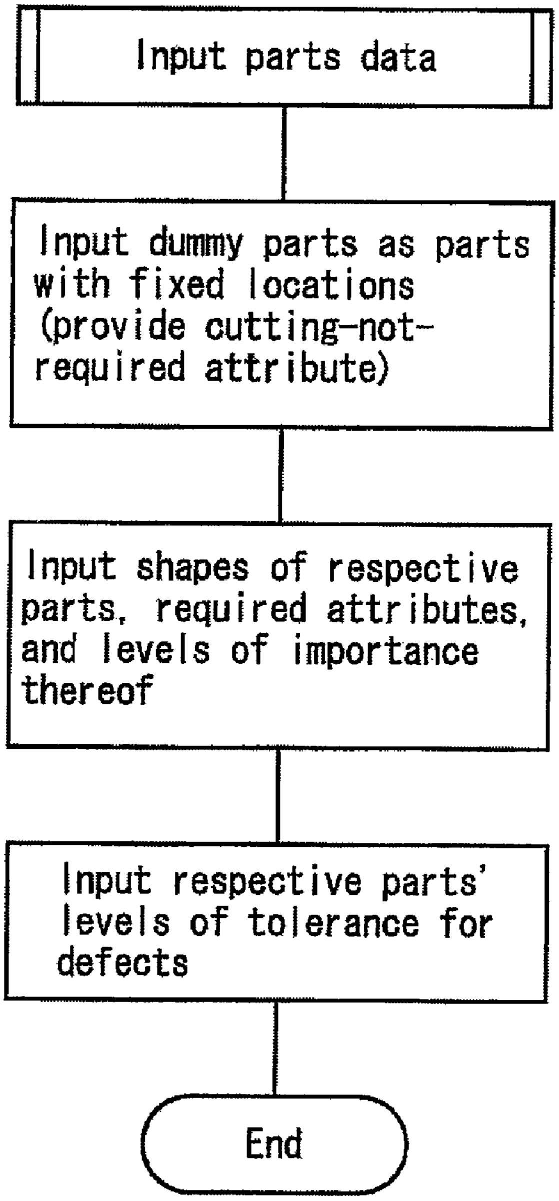
FIG. 7 is a flowchart showing an algorithm for inputting parts data in the embodiment.
Figure 8:
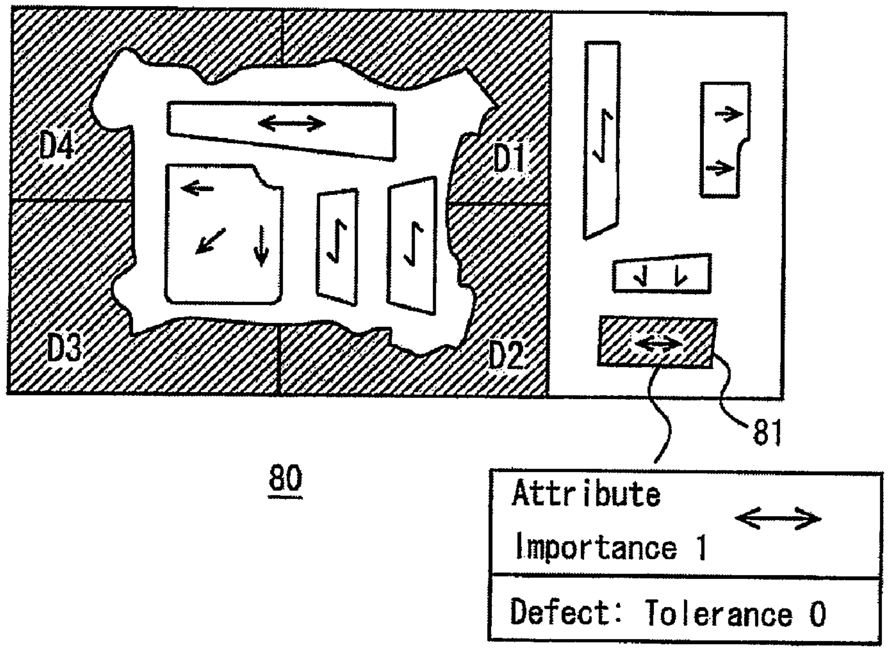
FIG. 8 is a diagram schematically showing an example of parts data in the embodiment.

FIGS. 7 and 8 show the creation of parts data. Dummy part are generated as virtual parts, the locations of which are fixed. Also, the dummy part is provided with an attribute by which cutting of the contour of the dummy part periphery is not required. Further, the locations of dummy parts do not have to be fixed, but if they are not fixed, for example, during patterning it is possible that dummy parts D1 and D3 of FIG. 8 could be switched around, and dummy parts D2 and D4 of FIG. 8 could be switched around. Accordingly, it is desirable that dummy parts be treated as parts having fixed locations.

The shape, required attributes, and levels of importance thereof are inputted for each part that is actually to be positioned. For example, in the case of part 81 in parts data 80 of FIG. 8, the required value of the orientation direction is described as an attribute, and the importance thereof is described as 1. In this embodiment, for example, it is supposed that the higher the value of the level of importance, the lower the importance, and that a value of 0 is the highest level of importance. Further, the tolerance level for defects is set at 0 for part 81, and an area having a defect must not be used for part 81. In FIG. 8, dummy parts D1 through D4 are positioned first, and a portion of the parts, which are to actually be positioned, are initially positioned on the inner side of the dummy parts D1 through D4, and the remainder are positioned on the outer side of the dummy parts D1 through D4.

Figure 9:
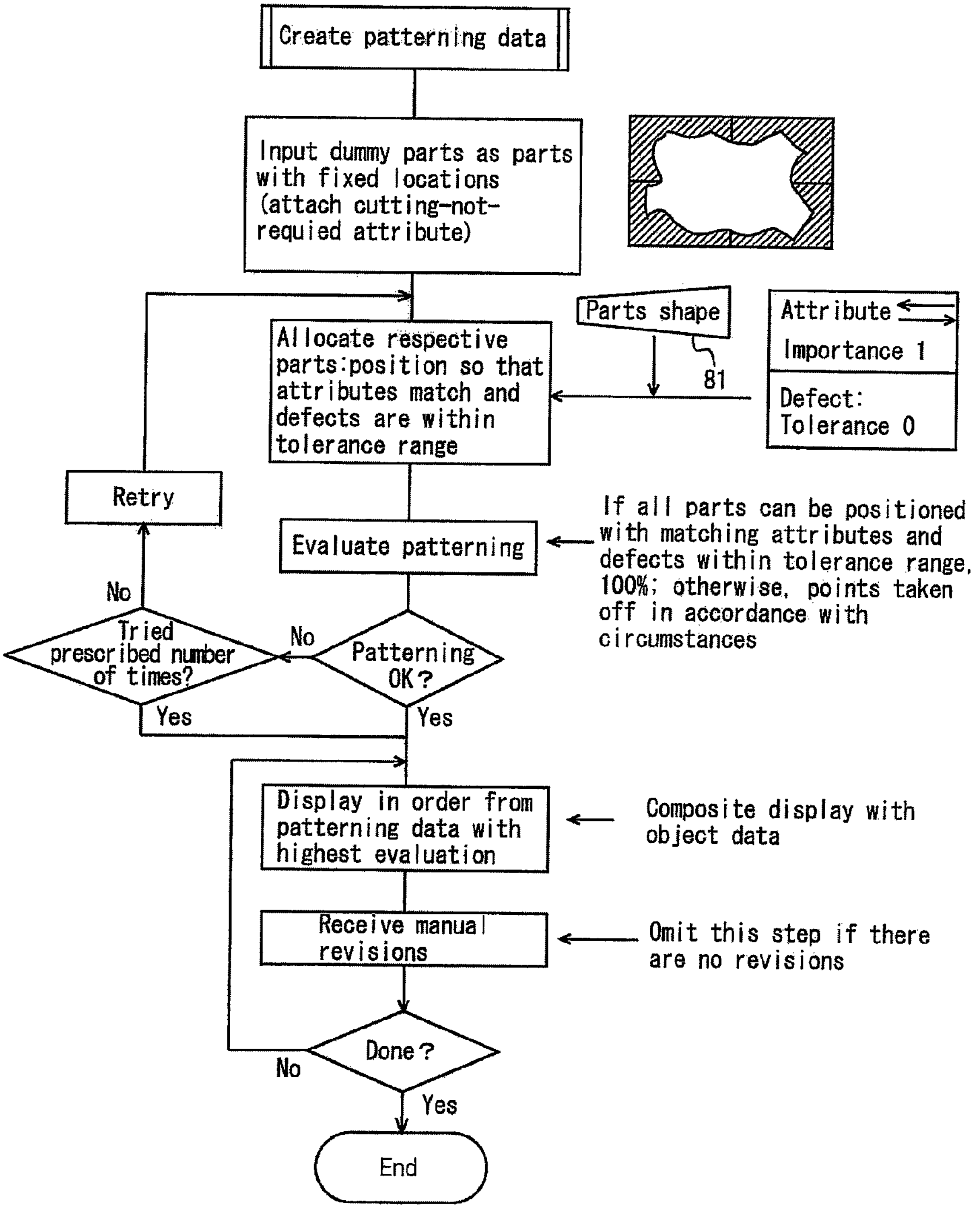
FIG. 9 is a flowchart showing an algorithm for creating patterning data in the embodiment.
Figure 10:
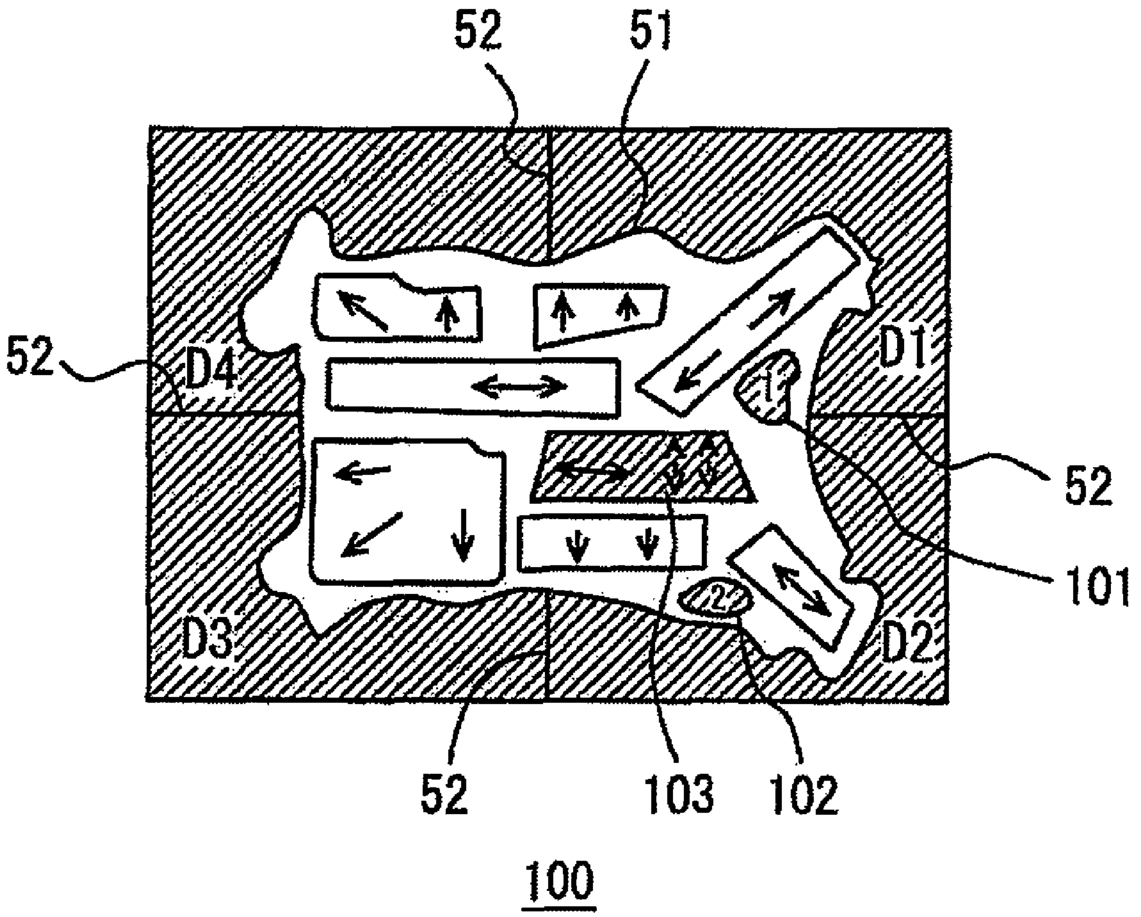
FIG. 10 is a diagram schematically showing an example of patterning data in the embodiment.

FIGS. 9 and 10 show algorithms for creating patterning data. Dummy parts are positioned as fixed parts on the outer side of a piece of leather or other such sheet material within the rectangular data. Next, the respective parts are positioned in areas that are not blocked by the dummy parts. Since a patterning apparatus traditionally positions respective parts so that they do not overlap one another, if the dummy parts are positioned and fixed first, the respective parts are positioned so as to avoid these dummy parts, resulting in the respective parts being positioned inside the outline of the leather or other such sheet material.

In positioning the respective parts, positioning is done so that the required attributes for the parts and the required attributes of the leather coincide, and defects are within the tolerance range. In this way, the respective parts are temporarily positioned, and patterning results are evaluated. If positioning can be done such that all the parts are on the inner side of the dummy parts, the attributes on the parts side and the leather side match up, and the defects are within the tolerance range on the parts side, the evaluation value, for example, is 100%. Otherwise, points are taken off in accordance with the number of parts that could not be positioned, and the extent to which the attributes on the leather side and the parts side, such as orientation and defects, could not be matched up. Thus, if a patterning evaluation value in excess of a prescribed value is achieved, patterning is finished automatically. When this is not the case, positioning is retried a prescribed number of times. A prescribed number of sheets' worth of patterning data having high evaluation values in these steps are stored in order from the highest value.

When automatic patterning ends, processing proceeds to manual revisions, and, for example, patterning data is displayed in order from the highest evaluation value as shown in FIG. 10. In the patterning data 100 of FIG. 10, patterning achieved via object data is superimposed and displayed, attributes, such as the orientation of the respective parts, and the attributes of the leather in the proximity thereof are displayed so as to be able to compare the required attributes of the parts against the leather attributes by changing the color and thickness of the lines, and defect data 101 and 102 of the object data side is also displayed. Further, so as to be able to distinguish between a part 103, which caused an error, and parts positioned normally, the parts are displayed with appropriate markings attached and/or in different colors. The error here was due to the required attribute for the orientation direction of part 103 (solid line in the figure) being different from the orientation direction of the leather in that location (broken line in the figure), and the display is carried out so as to make this difference visually apparent. Accordingly, for example, patterning is completed by moving the part 103 manually. The patterned leather is cut by the cutting head 8, and the respective parts are cut along their contours at this time, but the contours of the dummy parts are not cut.

The following effects are achieved in this embodiment.

1) An irregularly shaped piece of leather 12 can be patterned even with a patterning apparatus that can only position parts for rectangular data.

2) Attributes such as leather orientation and defects can be matched up with the attributes required for a part.

3) Attributes can easily be inputted by using a knowledge database and interpolating inputted attributes.

Furthermore, dummy parts are not limited to being positioned solely on the outer side of a piece of leather or a scrap of cloth. For example, when only half of the leather of a whole cowhide is to be used in patterning, and the remaining half of the cowhide is to be saved without being used, using dummy parts to cover the area that is to be saved without be subjected to patterning means that only the area not covered by dummy parts is patterned.

The invention claimed is:

1. An apparatus for patterning a sheet material by arranging a plurality of parts inside a rectangle, said patterning apparatus comprising:

an inputting element configured to input an irregular shape of said sheet material;

a dummy part creation element configured to make an area outside of the sheet material shape and within the rectangle a dummy part;

an attribute provision element configured to provide a cutting-not-required attribute for the contour of the dummy part and to provide a cutting-required attribute for the contours of said plurality of parts;

an arrangement element configured to arrange said plurality of parts on the inside of the sheet material shape by blocking the dummy part from overlapping with other parts; and a controller element configured to control a cutting element to cut said sheet material in accordance with the arrangement of said plurality of parts and to only cut the contours of the parts for which a cutting-required attribute has been provided.

2. The patterning apparatus according to claim 1, further comprising:

a segment attribute adding element configured to add attributes of respective segments of the sheet material to data which represents the shape of the sheet material;

a part attribute adding element configured to add an attribute required for a part to parts data; and a patterning element configured to pattern the part so that the attributes of the respective segments of the sheet material match the attribute required for the part.

3. A method for patterning a sheet material by arranging a plurality of parts inside a rectangle, said method comprising:

inputting an irregular shape of a sheet material, and arranging same inside said rectangle;

generating a dummy part comprising an area outside of the sheet material shape and within the rectangle;

providing a cutting-not-required attribute for the contour of the dummy part;

providing a cutting-required attribute for the contours of said plurality of parts;

arranging said plurality of parts on the inside of the sheet material shape by blocking the dummy part from overlapping with other parts; and cutting said sheet material in accordance with the arrangement of said plurality of parts, wherein said cutting cuts only the contours of the parts for which a cutting-required attribute has been provided.

4. A computer-readable medium having instructions stored thereon for patterning a sheet material by arranging a plurality of parts inside a rectangle, said instructions when executed by a computer cause the computer to:

input an irregular shape of said sheet material;

arrange the inputted sheet material shape within said rectangle, and make an area outside of the sheet material shape and within the rectangle a dummy part;

provide a cutting-not-required attribute for the contour of the dummy part;

provide a cutting-required attribute for the contours of said plurality of parts;

arrange said plurality of parts on the inside of the sheet material shape while blocking the dummy part from overlapping with other parts; and cut said sheet material in accordance with the arrangement of said plurality of parts, wherein only the contours of the parts for which a cutting-required attribute has been provided are cut.

5. The apparatus of claim 1, further comprising an object data storage portion that stores data representing the dummy part.

6. The method of claim 3, further comprising storing data representing the dummy part.

7. The computer-readable medium of claim 4, wherein said instruction further comprise the computer to store data representing the dummy part.

* * * * *